United States Patent
Bae et al.

(10) Patent No.: US 8,325,868 B2
(45) Date of Patent: Dec. 4, 2012

(54) SYNCHRONIZATION APPARATUS FOR ACCURATELY DEMODULATING SIGNAL INPUT TO PJM TAG AND PJM TAG INCLUDING THE SYNCHRONIZATION APPARATUS

(75) Inventors: Ji-hoon Bae, Daejeon-si (KR); Gil-young Choi, Daejeon-si (KR); Dong-han Lee, Daejeon-si (KR); Hoon-gee Yang, Seoul (KR); Jong-suk Chae, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 513 days.

(21) Appl. No.: 12/608,862

(22) Filed: Oct. 29, 2009

(65) Prior Publication Data
US 2010/0246738 A1  Sep. 30, 2010

(30) Foreign Application Priority Data
Mar. 31, 2009 (KR) .................. 10-2009-0027456

(51) Int. Cl.
*H04L 7/02* (2006.01)

(52) U.S. Cl. .......... 375/371; 375/147; 375/15; 375/316; 375/354; 375/355; 375/356; 375/357; 375/362; 375/364; 375/365; 375/366; 375/367; 375/368

(58) Field of Classification Search .................. 375/371, 375/147, 152, 316, 354, 355, 356, 357, 362, 375/364, 365, 366, 367, 368
See application file for complete search history.

(56) References Cited

U.S. PATENT DOCUMENTS

| | | | |
|---|---|---|---|
| 6,967,573 B1 | 11/2005 | Murdoch et al. | |
| 2005/0225437 A1* | 10/2005 | Shiotsu et al. | 340/10.51 |
| 2007/0153873 A1* | 7/2007 | Fullerton | 375/130 |
| 2008/0267331 A1 | 10/2008 | Littlechild et al. | |
| 2009/0010360 A1* | 1/2009 | Murdoch | 375/302 |
| 2009/0110128 A1* | 4/2009 | Yu et al. | 375/354 |
| 2010/0002803 A1* | 1/2010 | Murdoch et al. | 375/300 |

FOREIGN PATENT DOCUMENTS

| | | |
|---|---|---|
| JP | 08-331114 | 12/1996 |
| JP | 2007-97154 A | 4/2007 |
| JP | 2007-228082 A | 9/2007 |

* cited by examiner

*Primary Examiner* — Siu Lee
(74) *Attorney, Agent, or Firm* — Kile Park Goekjian Reed & McManus PLLC

(57) ABSTRACT

A passive phase jitter modulation (PJM) tag is charged with power in a continuous wave (CW) section. When receiving a command from a reader, the passive PJM tag must recognize the command and determine exactly when to begin demodulating the command. Only then can the passive PJM tag demodulate the command. To this end, a synchronization apparatus for accurately demodulating a signal input to a PJM tag includes a plurality of correlators correlating a received phase jitter-modulated signal with a template of an internal matched filter which is in the same form as at least a portion of a modified frequency modulation (MFM) flag.

16 Claims, 9 Drawing Sheets

SYNCHRONIZATION APPARATUS FOR ACCURATELY DEMODULATING SIGNAL INPUT TO PJM TAG AND PJM TAG INCLUDING THE SYNCHRONIZATION APPARATUS

CROSS-REFERENCE TO RELATED APPLICATION

This application claims the benefit under 35 U.S.C. §119 (a) of Korean Patent Application No. 10-2009-0027456 filed on Mar. 31, 2009, the disclosure of which is incorporated by reference in its entirety for all purposes.

BACKGROUND

1. Field

The following description relates to Radio Frequency Identification (RFID), and more particularly, to a synchronization technology for modulating a signal input to a tag.

2. Description of the Related Art

The International Organization for Standardization/International Electrotechnical Commission (ISO/IEC) 18000 series details international standards for Radio Frequency Identification (RFID) wireless access, and 13.56 MHz standards are defined in ISO/IEC 18000 Part 3. Part 3 is classified into mode-1, mode-2, and mode-3 according to a modulation scheme and an encoding scheme.

Mode-1 has been suggested by Philips and Texas Instruments (TI) and adopts an amplitude shift keying (ASK) modulation scheme and a pulse position modulation (PPM) encoding scheme. It is a communication standard that uses a single channel. Mode-2 has been suggested by Magellan Technology and adopts a phase jitter modulation (PJM) scheme and a double frequency modified frequency modulation (DFMFM) encoding scheme. It is a communication standard that uses multiple channels. Mode-3 can adopt both of the ASK and PJM modulation schemes and thus uses mode-1 and mode-2 together. An ASK mode adopts pulse interval encoding (PIE) as an encoding scheme, and a PJM mode adopts modified frequency modulation (MFM) as an encoding scheme. Mode-3 is intentionally made to have the same logical layer as 18000-6 Type C which is an RFID communication standard for an ultra-high frequency band. Thus, mode-3 lays the foundation for technological advancement toward the integration of an ultra-high frequency band and a high frequency band.

Since the PJM mode of mode-3 is for communication using multiple channels, it has a far shorter tag recognition time than the ASK mode using a single channel. However, it is impossible to detect an envelope of a signal input to a tag, which makes it difficult to extract a payload data start position. In addition, since a phase difference between two PJM signals is very small, it is difficult to demodulate the phases thereof.

A passive PJM tag is charged with power in a continuous wave (CW) section. When receiving a command from a reader, the passive PJM tag must recognize the command. In addition, the passive PJM tag must identify a position where an MFM flag, which is a preamble to the command, ends and demodulate payload data that follows the MFM flag. However, it is not easy for the tag to recognize a change in a signal, which is received from the reader, when it changes from a CW to a command and determine a start position of payload data, which is to be demodulated, even when it has been recognized that the command is being received. Furthermore, since a phase difference between PJM signals is very small, it is not easy to demodulate the PJM signals.

SUMMARY

It is an objective of the present invention to provide a technical solution which can be implemented to recognize a modified frequency modulation (MFM) flag when receiving the MFM flag and demodulate a PJM signal by determining a payload data start position.

According to an exemplary aspect, there is provided a synchronization apparatus for accurately demodulating a signal input to a phase jitter modulation (PJM) tag. The synchronization apparatus includes a plurality of correlators correlating a received phase jitter-modulated signal with a template of an internal matched filter which is in the same form as at least a portion of an MFM flag.

The synchronization apparatus further includes: an optimum signal selector dividing a signal received through a single path into a plurality of paths, obtaining values by sampling a signal of each path at a different position with respect to the position of sampling of the other paths, selecting a path which can ensure a highest demodulation performance by comparing the obtained values, and outputting a signal of the selected path; and a quantizer quantizing the signal output from the optimum signal selector and outputting the quantized signal to the correlators.

The correlators include a first correlator correlating a signal, which is output from the quantizer and received through a first path, with a template of an internal matched filter, which is in the same form as at least a portion of the MFM flag, to determine whether a command is being received. The template is identical to a synchronizing string of the MFM flag.

The correlators include two or more correlators correlating a signal, which is output from the quantizer and received through a second path, with a template of an internal matched filter, which is in the same form as at least a portion of the MFM flag, to determine when to perform demodulation. The template is identical to a waveform which includes the last few bits of the synchronizing string of the MFM flag and the first few bits of an MFM encoding violation of the MFM flag.

The synchronization apparatus further includes a peak detector detecting a peak from an output value of the first correlator on a bit-by-bit basis, wherein the two or more correlators are activated after being delayed for different periods of time from when the peak was initially detected.

The synchronization apparatus further includes a demodulation timing determiner comparing output values of the two or more correlators, delaying a signal, which is output from the quantizer, for a period of time corresponding to one of the two or more correlators which outputs a highest value, and inputting the delayed signal to a demodulator.

According to another exemplary aspect, there is provided a PJM tag including: an optimum signal selector dividing a signal received through a single path into a plurality of paths, obtaining values by sampling a signal of each path at a different position with respect to the position of sampling of the other paths, selecting a path which can ensure a highest demodulation performance by comparing the obtained values, and outputting a signal of the selected path; a quantizer quantizing the signal output from the optimum signal selector; a first correlator correlating a signal, which is output from the quantizer and received through a first path, with a template of an internal matched filter which is in the same form as at least a portion of an MFM flag; a peak detector detecting a peak from an output value of the first correlator on a bit-by-bit basis; second and third correlators activated after being delayed for different periods of time from when the peak was initially detected by the peak detector and correlating a signal, which is output from the quantizer and received through a second path, with a template of an internal matched filter which is in the same form as at least a portion of the MFM flag; a switch used to input a signal output from the quantizer to a demodulator through a third path; and a demodulation timing determiner comparing output values of the second and third correlators, waiting a period of time based on the comparison result, and shutting the switch.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain aspects of the invention.

DETAILED DESCRIPTION

The above and other features and advantages of the present invention will become more apparent by describing exemplary embodiments thereof with reference to the attached drawings. Exemplary embodiments of the present invention will now be described in detail so that they can be readily understood and applied by those skilled in the art.

Figure 1:
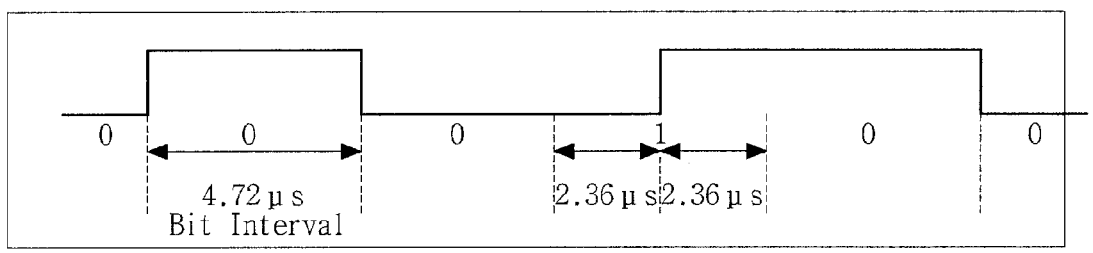
FIG. 1 is a reference diagram illustrating a modified frequency modulation (MFM) encoding waveform and a bit interval in a phase jitter modulation (PJM) mode adopted by an international standard.

FIG. 1 is a reference diagram illustrating a modified frequency modulation (MFM) encoding waveform and a bit interval in a phase jitter modulation (PJM) mode adopted by an international standard.

All data in a reader is MFM-encoded before being sent to a tag. In addition, a bit is interval is in accordance with a PJM mode of International Organization for Standardization (ISO)-18000-3 mode 3, which is an international standard, and standards suggested by EPCglobal. Referring to FIG. 1, a phase transition occurs in the middle of a bit to represent a "1", and a phase transition occurs at the beginning of a bit to represent a "0". However, in a "0" that immediately follows a "1", a phase transition does not occur at the beginning of a bit. "0" and "1" have the same bit interval.

Figure 2:
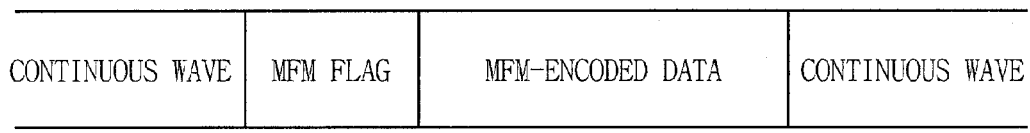
FIG. 2 illustrates the structure of a command of the PJM mode according to an international standard.

FIG. 2 illustrates the structure of a command of the PJM mode according to an international standard.

Referring to FIG. 2, a command in the PJM mode consists of an MFM flag and an MFM-encoded data signal. According to an international standard, all commands sent from a reader to a tag begin with an MFM flag.

Figure 3:
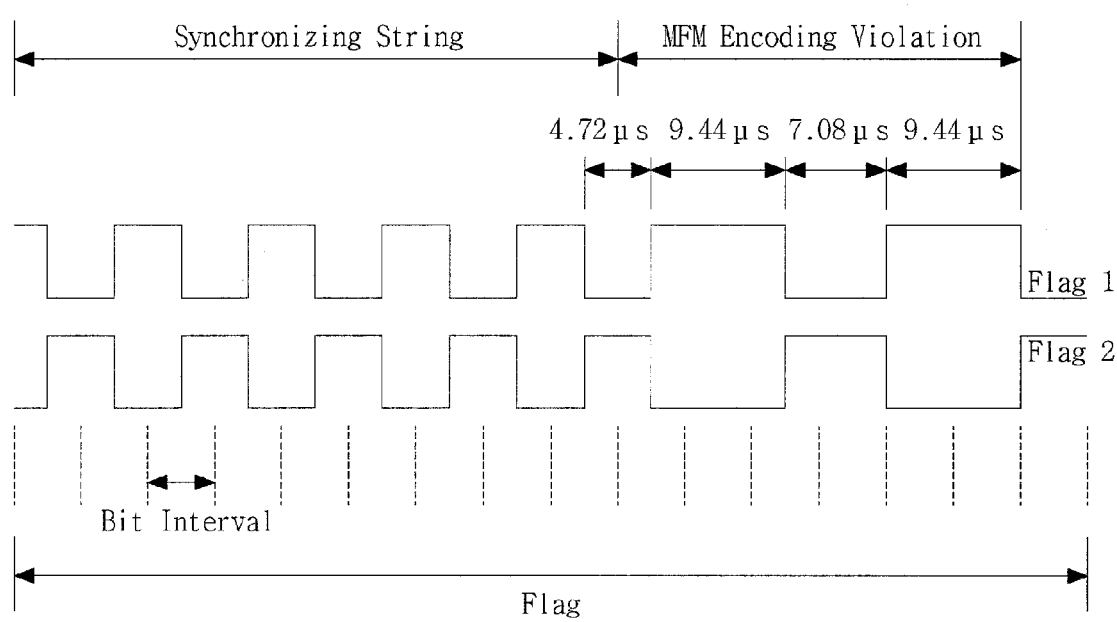
FIG. 3 is a waveform diagram of an MFM flag of the PJM mode according to an international standard.

FIG. 3 is a waveform diagram of an MFM flag of the PJM mode according to an international standard.

Referring to FIG. 3, an MFM flag takes one of two forms (Flag 1 and Flag 2) according to a logic level of its first bit. In the present specification, an MFM flag whose first bit is logic high will be described. All commands that a reader sends to a tag begin with an MFM flag which is a preamble. As illustrated in FIG. 3, an MFM flag has 16 bits and consists of a synchronizing string, an MFM encoding violation, and a trailing zero. The synchronizing string includes nine continuous bits having a data value of one, and the MFM encoding violation includes six bits. The trailing zero is followed by payload data which is an actual command.

Figure 4:
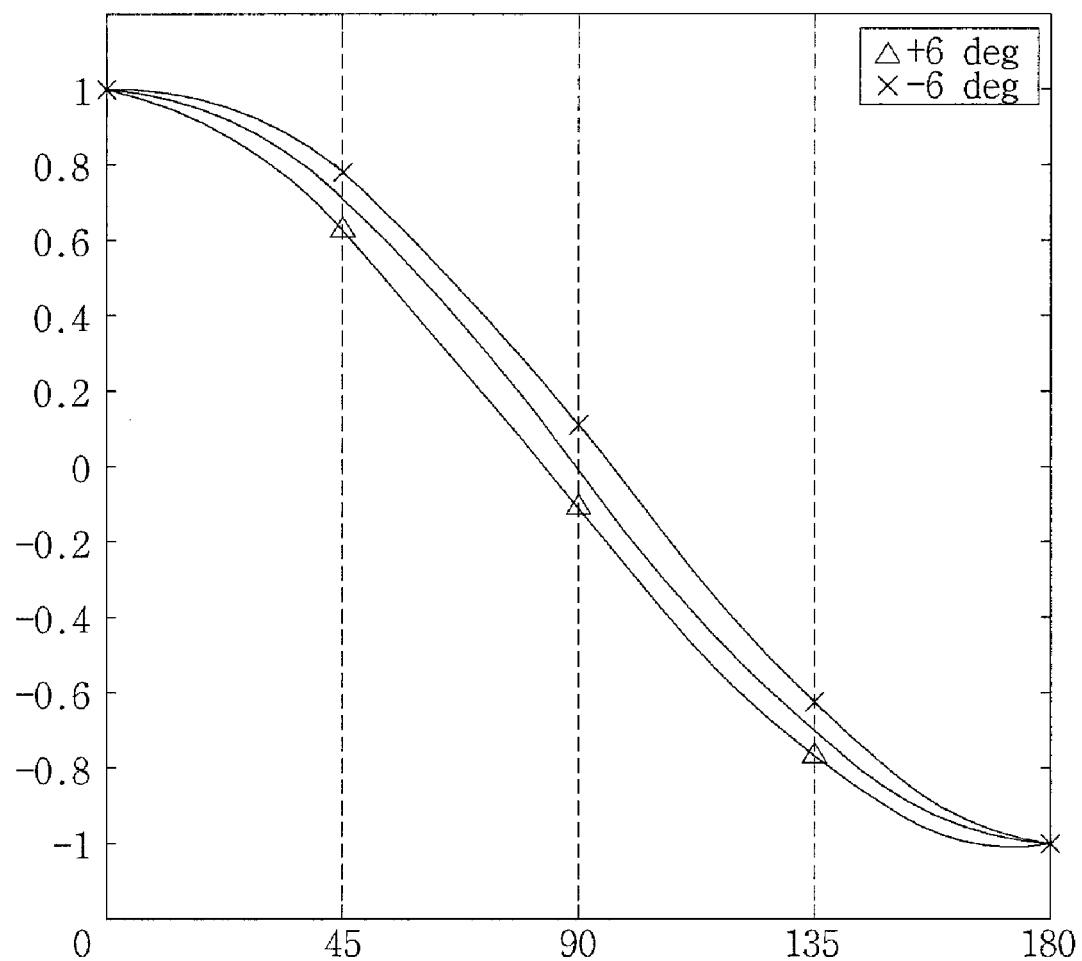
FIG. 4 is a graph illustrating signal size with respect to a phase difference between a PJM signal and a continuous wave (CW) signal.

FIG. 4 is a graph illustrating signal size with respect to a phase difference between a PJM signal and a continuous wave (CW) signal.

Referring to FIG. 4, a PJM signal has a phase difference of a maximum of ±6 degrees with respect to a CW signal (shown as a solid line in the middle) which has a phase of zero degrees. That is, since a phase difference between the PJM signal and the CW signal is insignificant, phase difference extraction results in a low demodulation performance. Thus, it is very important to find an optimum sampling position. In FIG. 4, an amplitude difference between two PJM signals is greatest at a 90-degree position at which the CW signal has a size of zero degrees. Thus, the 90-degree position is an optimum sampling position. Accordingly, a signal that is received must be sampled at a position nearest to the 90-degree position. On the other hand, the two PJM signals are the same size at a 0-degree position and a 180-degree position. Thus, if a signal that is received is sampled at any one of the 0-degree position and the 180-degree position, it cannot be demodulated.

Figure 5:
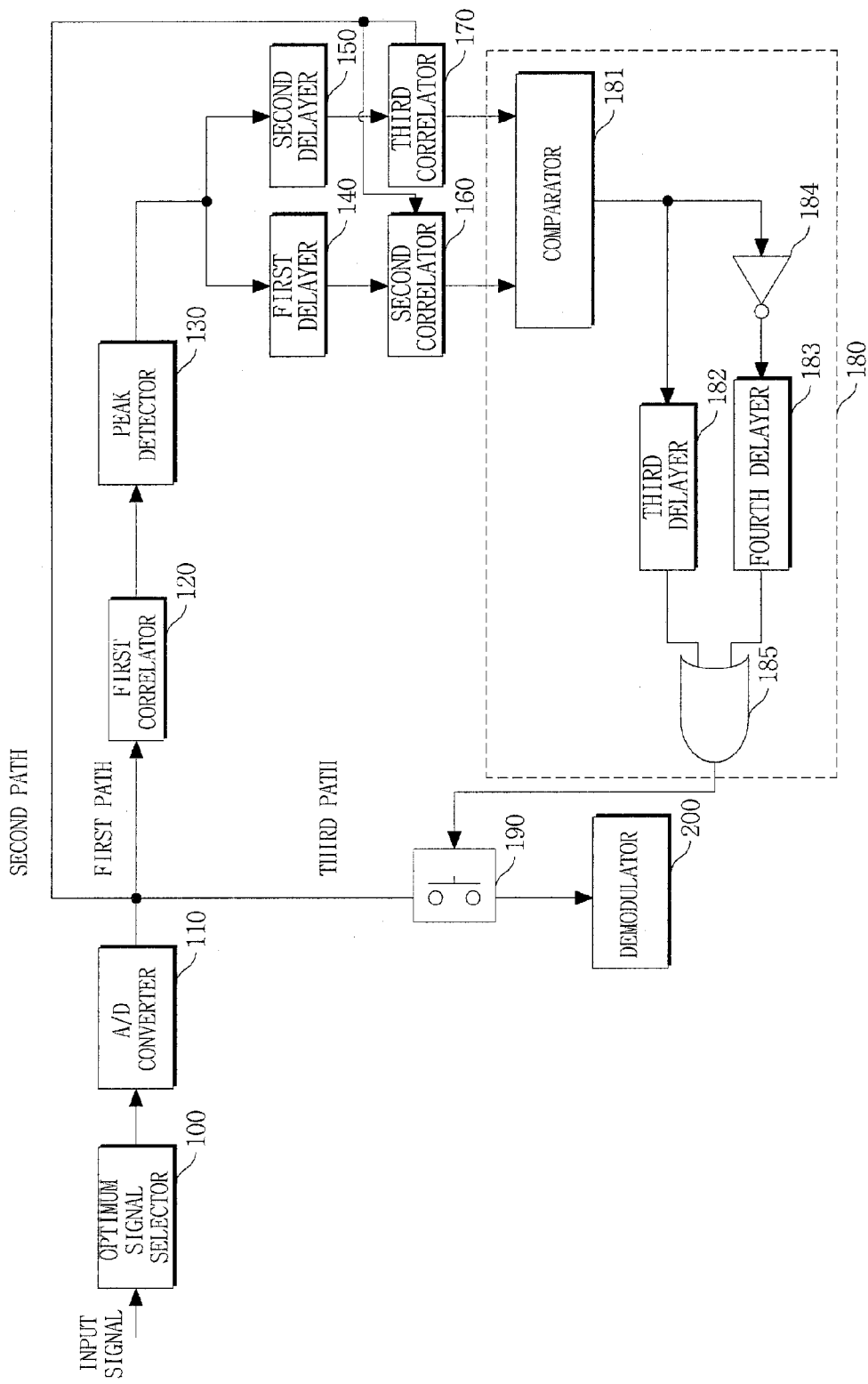
FIG. 5 illustrates blocks for synchronizing and demodulating a PJM signal according to an exemplary embodiment.

FIG. 5 illustrates blocks for synchronizing and demodulating a PJM signal according to an exemplary embodiment.

Figure 6:
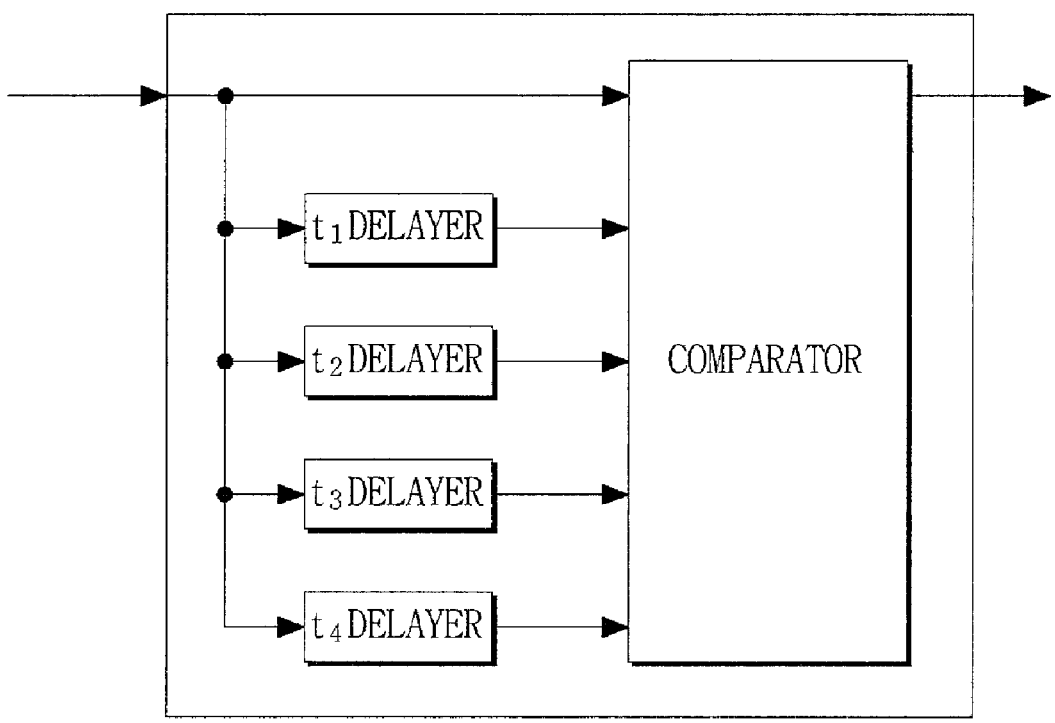
FIG. 6 is a block diagram of an optimum signal selector according to an exemplary embodiment.

Referring to FIG. 5, in order to optimize the demodulation performance, an optimum signal selector 100 divides a signal that is received into a plurality of paths, samples each path at a different position (in the same sampling cycle), compares values obtained by sampling the paths, and selects a path which can ensure a highest demodulation performance. FIG. 6 is a block diagram of an optimum signal selector according to an exemplary embodiment. Referring to FIG. 6, the optimum signal selector divides a CW signals to be received into five paths, obtains sampled values by sampling the five divided signals at five sequential positions, the five positions in total covering half a cycle of the CW signal, and selects a signal output from a path whose sampled value is closest to zero. For example, when one of the five divided signals is sampled at a first sampling position, the other signals are sequentially sampled at intervals of 45 degrees in the half a cycle of the CW signal. Then, a path from which a signal having a sampled value closest to zero is output is selected.

Referring back to FIG. 5, signals output from the optimum signal selector 100 are discrete signals obtained by sampling a signal, which is received, at regular intervals. The signals output from the optimum signal selector 100 are quantized by an analog/digital (A/D) converter 100 (i.e., a quantizer) into signals that can actually be used in a synchronization and modulation process. A signal that has been through the A/D conversion process is divided again into three paths. A first path is connected to a first correlator 120, a second path is connected to a second correlator 160 and a third correlator 170, and a third path is connected to a demodulator 200. Since a PJM tag is charged with power during a CW section, the second and third paths are deactivated in the CW section.

Figure 7:
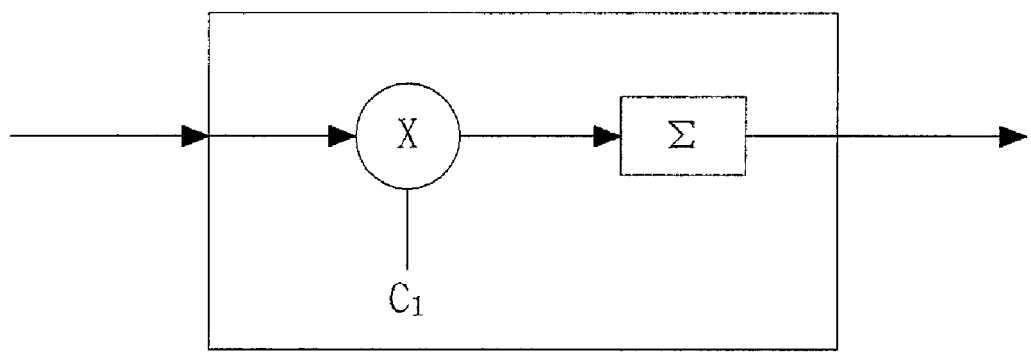
FIG. 7 illustrates the structure of a first correlator shown in FIG. 5.
Figure 8:
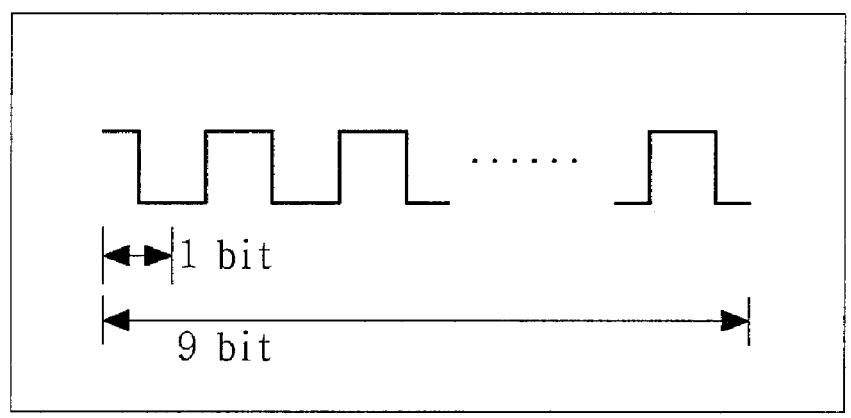
FIG. 8 illustrates a template of a matched filter of the first correlator.
Figure 9:
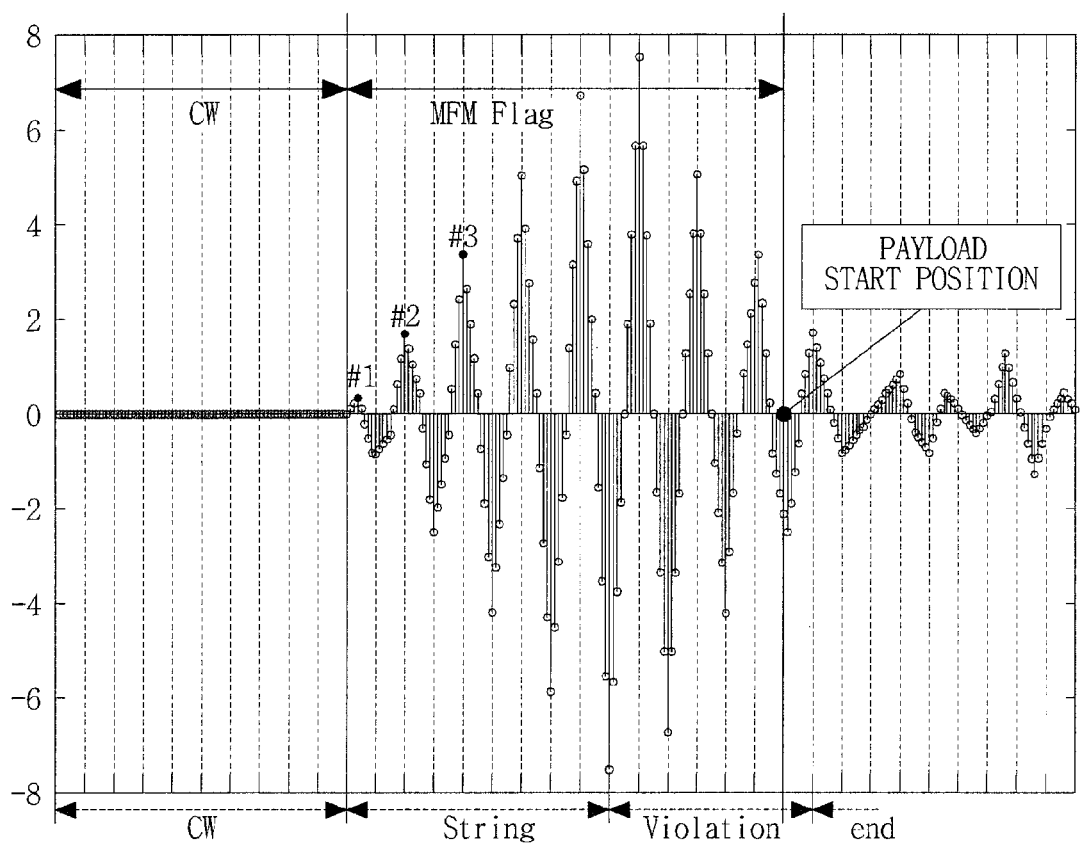
FIG. 9 is an output waveform diagram of the first correlator.

The first correlator 120 performs a correlation operation on a signal received from the A/D converter 110 by using a template. The structure of the first correlator 120 is illustrated in FIG. 7. A first template $C_1$ is a template of a matched filter of the first correlator 120 and is a reference signal used for an output of the first correlator 120. In an embodiment, the first template $C_1$ may be in the same form as a 9-bit synchronizing string of an MFM flag, as illustrated in FIG. 8. The first correlator 120 performs the correlation operation using the first template $C_1$ which is in the same form as the 9-bit synchronizing string of an MFM flag, such that a peak waveform is output where the MFM flag begins. An output waveform of the first correlator 120 is illustrated in FIG. 9. FIG. 9 illustrates an approximate output waveform of the first correlator 120 which receives a CW and an MFM flag.

Referring to the output waveform of FIG. 9, an output value of the first correlator 120 is maintained at zero in a CW section. When the first correlator 120 begins to receive an MFM flag, the output value of the first correlator 120 increases or decreases on a bit-by-bit basis to produce peak values. Since the first template $C_1$ has 9 bits, an absolute value of a peak is highest at a position of a tenth bit and then gradually reduces. Therefore, when the output value begins to increase, a PJM tag recognizes that a command is being received.

In FIG. 9, each peak is created as the output value of the first correlator 120 increases and then decreases. In addition, a payload data start position is determined based on where a detected peak comes in the sequence of peaks. Thus, a peak detector 130 detects a peak and outputs the detected peak. However, the exact position of where a peak detected by the peak detector 130 comes in the sequence of peaks may be difficult to identify due to the presence of noise. Therefore, once the peak detector 130 detects a peak, where the detected peak comes in the sequence of peaks must be identified. In a noisy environment, a first peak is generally not detected since it is small, and thus a second or third peak is detected. For this reason, an embodiment for detecting the second or third peak will be described below.

Figure 10:
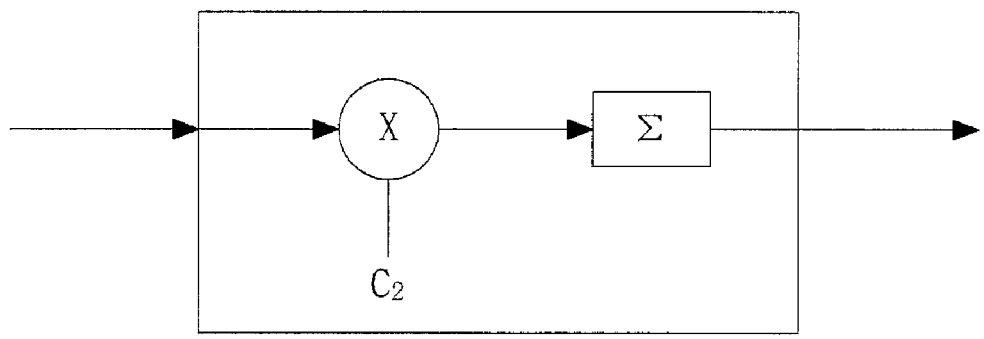
FIG. 10 illustrates the structure of second and third correlators shown in FIG. 5.
Figure 11:
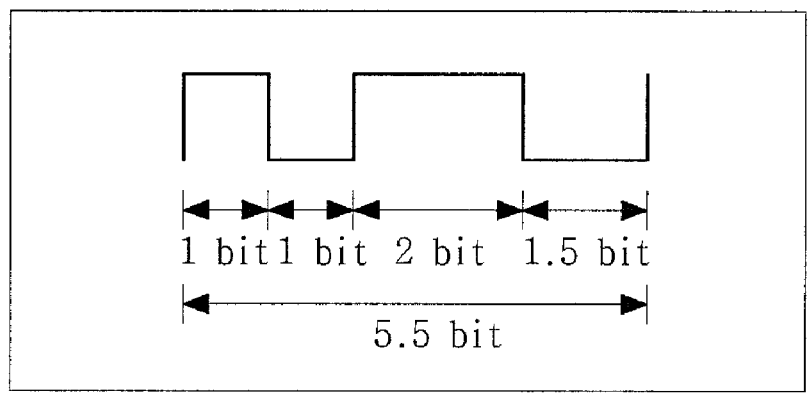
FIG. 11 illustrates a template of a matched filter of the second and third correlators.

The peak detector 130 transmits a trigger signal to each of the second and third correlators 160 and 170 via first and second delayers 140 and 150 which have different delay times and are located in different paths. The second and third correlators 160 and 170 have the same structure illustrated in FIG. 10. A second template $C_2$ is a template of a matched filter of each of the second and third correlators 160 and 170 and is a reference signal used for an output of each of the second and third correlators 160 and 170. In an embodiment, the second template $C_2$ is in the same form as a waveform which consists of the last 1.5 bits of a synchronizing string and the first 4 bits of an MFM encoding violation, as illustrated in FIG. 11. Therefore, when a portion of an MFM flag, which has the same waveform as the second template $C_2$, passes through the second and third correlators 160 and 170, the second and third correlators 160 and 170 may output peak values. These characteristics may be used to find out the position of an initially detected peak.

A delay time $t_a$ of the first delayer 140 and a delay time $t_b$ of the second delayer 150 are delay values used to detect the second and third peaks, respectively. If the effect of noise is small enough to make the first peak detectable, the delay values of the first and second delayers 140 and 150 can be changed.

When initially detecting a peak, the peak detector 130 transmits a trigger signal to each of the second and third correlators 160 and 170 through two paths delayed for the delay times $t_a$ and $t_b$ by the first and second delayers 140 and 150, respectively, thereby activating the second and third correlators 160 and 170. Here, a signal which is output from the A/D converter 110 and travels along the second path is input to the second and third correlators 160 and 170. Output values of the second and third correlators 160 and 170 vary according to the position of a peak. An output value $V\alpha$ of the second correlator 160 and an output value $V\beta$ of the third correlator 170 are input to a comparator 181 of a demodulation timing determiner 180 and then compared. If the output value $V\alpha$ of the second correlator 160 is greater than the output value $V\beta$ of the third correlator 170, it is determined that a detected peak is a second peak #2 (see FIG. 9). If not, it is determined that the detected peak is a third peak #3 (see FIG. 9).

Figure 12:
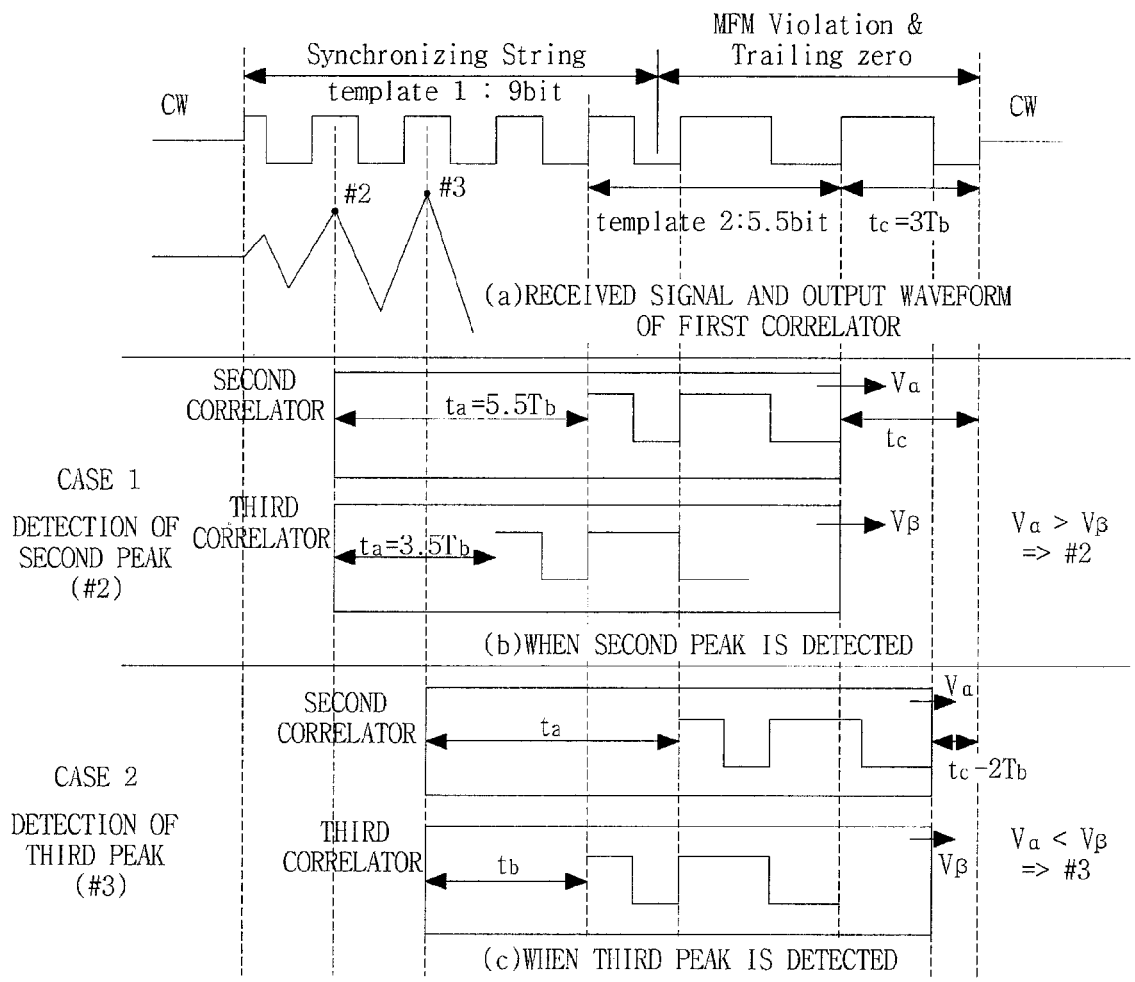
FIG. 12 illustrates a signal input to a PJM tag, a waveform of the signal that passed through the first correlator, and a time when the signal is input to each of the second and third correlators after a peak is detected.

The above results can be easily understood from FIG. 12. In FIG. 12, the horizontal axis is time, and illustrated are all of a signal (a CW and an MFM flag) input to a PJM tag, a waveform of the signal that passed through the first correlator 120, and a time when the signal, which is delayed for the delay time $t_a$ or $t_b$ according to the position of a detected peak, is input to each of the second and third correlators 160 and 170.

FIG. 12A illustrates a CW and an MFM flag which are an input signal. Referring to FIG. 12A, a portion of the MFM flag waveform is in the same form as the second template $C_2$. As described above, if this portion passes through the second and third correlators 160 and 170, peak values are output from the second and third correlators 160 and 170 since the portion is in the same form as the second template $C_2$.

If a peak initially detected by the peak detector 130 is the second peak #2, the second correlator 160 is activated after being delayed for the delay time $t_a$ from the detection of the peak, as illustrated in FIG. 12B. Then, the second correlator 160 performs an operation beginning with the portion of the MFM flag of the signal input to the PJM tag which has exactly the same waveform as the second template $C_2$. As a result, a relatively high peak value $V\alpha$ is output from the second correlator 160. Meanwhile, the third correlator 170 performs an operation on a signal, which passes therethrough, $2T_b$ earlier. Thus, a relatively small value $V\beta$ is output from the third correlator 170. When the output value $V\alpha$ of the second correlator 160 is greater than the output value $V\beta$ of the third correlator 170, it is determined that the detected peak is the second peak #2. On the other hand, if the peak initially detected by the peak detector 130 is the third peak #3, it can be identified through the same process as above, i.e. that the output value $V\alpha$ is less than the output value $V\beta$, as illustrated in FIG. 12C.

It can be easily seen from FIG. 12 that a difference between a time when the operations of the second and third correlators 160 and 170 end and a time when payload data starts is $t_c$ (=$3T_b$ where $T_b$ is a unit of time per bit) when a detected peak is the second peak #2 and is $t_c-2T_b$ when the detected peak is the third peak #3. Therefore, if a signal input to a PJM tag is demodulated after a corresponding delay time, it can be demodulated exactly from the payload data start position.

Referring to FIG. 5, when a detected peak is the first peak (Vα>Vβ), the comparator 181 outputs "1" which is then delayed for $t_c$ by a third delayer 182 and output to a switch 190 via an OR gate 185, thereby shutting the switch 190. Here, a signal that was input to the optimum signal selector 100 and passed through the A/D converter 110 is input to the demodulator 200 along the third path. Therefore, the signal of the third path is not demodulated in an MFM flag section. However, when the switch 190 is shut, that is, from the payload data start position, the signal begins to be demodulated.

On the other hand, when the detected peak is the third peak #3 (Vα<Vβ), the comparator 181 outputs "0" which is then inverted by a NOT gate 184 into "1," delayed for $t_c-2T_b$ by a fourth delayer 183, and output to the switch 190 via the OR gate 185, thereby shutting the switch 190. Therefore, demodulation can be performed exactly from the payload data start position.

The present invention has been particularly shown and described with reference to exemplary embodiments thereof. Terms or words used in this specification and claims should not be restrictively interpreted as ordinary meanings or dictionary-based meanings, but should be interpreted as meanings and concepts conforming to the technical spirit of the present invention on the basis of the principle that an inventor can properly define the concept of a term to describe and explain his or her invention in the most appropriate way.

Therefore, embodiments described herein and configurations illustrated in the drawings are merely the most exemplary embodiments of the present invention, but do not substitute all of the technical spirits of the present invention. So, it should be understood that various equivalents or modifications substituting for the embodiments could exist at a time point of the application of the present invention.

What is claimed is:

1. A synchronization apparatus for accurately demodulating a signal input to a phase jitter modulation (PJM) tag, the synchronization apparatus comprising a plurality of correlators correlating a received phase jitter-modulated signal, with a template of an internal matched filter which is in the same form as at least a portion of a modified frequency modulation (MFM) flag; and
    an optimum signal selector dividing a signal received through a single path into a plurality of paths, obtaining values by sampling a signal of each path at a different position with respect to the position of sampling of the other paths, selecting a path which can ensure a highest demodulation performance by comparing the obtained values, and outputting a signal of the selected path.

2. The synchronization apparatus of claim 1, further comprising:
    a quantizer quantizing the signal output from the optimum signal selector and outputting the quantized signal to the correlators.

3. The synchronization apparatus of claim 2, wherein the correlators comprise a first correlator correlating a signal, which is output from the quantizer and received through a first path, with a template of an internal matched filter, which is in the same form as at least a portion of the MFM flag, to determine whether a command is being received.

4. The synchronization apparatus of claim 3, wherein the template is identical to a synchronizing string of the MFM flag.

5. The synchronization apparatus of claim 3, wherein the correlators comprise two or more correlators correlating a signal, which is output from the quantizer and received through a second path, with a template of an internal matched filter, which is in the same form as at least a portion of the MFM flag, to determine when to perform demodulation.

6. The synchronization apparatus of claim 5, wherein the template is identical to a waveform which comprises the last few bits of the synchronizing string of the MFM flag and the first few bits of an MFM encoding violation of the MFM flag.

7. The synchronization apparatus of claim 5, further comprising a peak detector detecting a peak from an output value of the first correlator on a bit-by-bit basis, wherein the two or more correlators are activated after being delayed for different periods of time from when the peak was initially detected.

8. The synchronization apparatus of claim 7, wherein the peak detector transmits a trigger signal to each of the two or more correlators to activate the two or more correlators after delaying the two or more correlators for different periods of time.

9. The synchronization apparatus of claim 7, further comprising a demodulation timing determiner comparing output values of the two or more correlators, delaying a signal, which is output from the quantizer, for a period of time corresponding to one of the two or more correlators which outputs a highest value, and inputting the delayed signal to a demodulator.

10. The synchronization apparatus of claim 7, wherein the two or more correlators are a second correlator and a third correlator.

11. The synchronization apparatus of claim 9, further comprising a switch used to input a signal output from the quantizer to the demodulator through a third path, wherein the demodulation timing determiner causes the switch to be shut after the corresponding period of time.

12. A phase jitter modulation (PJM) tag comprising:
    an optimum signal selector dividing a signal received through a single path into a plurality of paths, obtaining values by sampling a signal of each path at a different position with respect to the position of sampling of the other paths, selecting a path which can ensure a highest demodulation performance by comparing the obtained values, and outputting a signal of the selected path;
    a quantizer quantizing the signal output from the optimum signal selector;
    a first correlator correlating a signal, which is output from the quantizer and received through a first path, with a template of an internal matched filter which is in the same form as at least a portion of a modified frequency modulation (MFM) flag;
    a peak detector detecting a peak from an output value of the first correlator on a bit-by-bit basis;
    second and third correlators activated after being delayed for different periods of time from when the peak was initially detected by the peak detector and correlating a signal, which is output from the quantizer and received through a second path, with a template of an internal matched filter which is in the same form as at least a portion of the MFM flag;
    a switch used to input a signal output from the quantizer to a demodulator through a third path; and
    a demodulation timing determiner comparing output values of the second and third correlators, waiting a period of time based on the comparison result, and shutting the switch.

13. The PJM tag of claim 12, wherein the template of the internal matched filter of the first correlator is identical to a synchronizing string of the MFM flag.

14. The PJM tag of claim 13, wherein the template of the internal matched filter of the second and third correlators is identical to a waveform which comprises the last few bits of the synchronizing string of the MFM flag and the first few bits of an MFM encoding violation of the MFM flag.

15. The PJM tag of claim 14, wherein the last few bits of the synchronizing string are 1.5 bits, and the first few bits of the MFM encoding violation of the MFM flag are 4 bits.

16. The PJM tag of claim 12, wherein the peak detector transmits a trigger signal to each of the second and third correlators to activate the second and third correlators after delaying the second and third correlators for different periods of time.

* * * * *